US006644675B2

(12) United States Patent
Ellis et al.

(10) Patent No.: US 6,644,675 B2
(45) Date of Patent: Nov. 11, 2003

(54) STAIR CHAIR

(75) Inventors: Jonathan Stewart Ellis, Bradford (GB); Philip Ian Ward, N. Yorkshire (GB)

(73) Assignee: Ferno-Washington, Inc., Wilmington, OH (US)

( * ) Notice: Subject to any disclaimer, the term of this patent is extended or adjusted under 35 U.S.C. 154(b) by 0 days.

(21) Appl. No.: 10/202,256

(22) Filed: Jul. 24, 2002

(65) Prior Publication Data

US 2002/0180183 A1 Dec. 5, 2002

Related U.S. Application Data

(62) Division of application No. 09/362,651, filed on Jul. 27, 1999, now Pat. No. 6,435,538.

(30) Foreign Application Priority Data

Jul. 31, 1998 (GB) .............................................. 9816615

(51) Int. Cl.[7] .................................................. B62B 5/02
(52) U.S. Cl. ............... 280/250.1; 280/642; 280/47.315; 280/47.25; 280/DIG. 10; 280/5.26
(58) Field of Search ........................... 280/250.1, 304.1, 280/650, 655.1, DIG. 10, 641, 642, 643, 644, 645, 47.131, 47.25, 47.315, 5.26, 5.2

(56) References Cited

U.S. PATENT DOCUMENTS

| 105,505 A | 7/1870 | Stagg |
|---|---|---|
| 658,123 A | 9/1900 | Rosenthal |
| 2,931,449 A | 4/1960 | King |
| 3,137,511 A | 6/1964 | Weil |
| 3,283,839 A | * 11/1966 | Brown et al. |
| 3,869,011 A | 3/1975 | Jensen |
| 4,046,391 A | 9/1977 | Restad et al. |
| 4,046,418 A | 9/1977 | Smith et al. |
| 4,105,242 A | 8/1978 | Terbeek |
| 4,109,740 A | 8/1978 | Andruchiw |
| 4,142,732 A | 3/1979 | Boyd |

(List continued on next page.)

FOREIGN PATENT DOCUMENTS

| EP | 2 203 937 | 11/1988 |
|---|---|---|
| EP | 0 345 040 | 12/1989 |
| EP | 0 697 322 | 8/1994 |
| EP | 0 634 158 | 1/1995 |
| EP | 0 634 311 | 1/1995 |
| GB | 719048 | 11/1954 |
| GB | 1 341 670 | 12/1973 |
| GB | 2 073 111 | 10/1981 |
| GB | 2 111 001 | 6/1983 |
| GB | 2 112 330 | 7/1983 |
| GB | 2 126 540 | 3/1984 |
| GB | 2 135 255 | 8/1984 |
| GB | 2 152 446 | 8/1985 |
| GB | 2 171 005 | 8/1986 |
| GB | 2 243 544 | 11/1991 |
| GB | 2 257 097 | 1/1993 |
| GB | 1 476 062 | 6/1997 |
| GB | 1 479 832 | 7/1997 |
| GB | 2 346 851 | 8/2000 |
| WO | WO 84/026 | 7/1984 |
| WO | WO 96/11610 | 4/1996 |
| WO | WO 96/23478 | 8/1996 |

*Primary Examiner*—Avraham Lerner
(74) *Attorney, Agent, or Firm*—Dinsmore & Shohl LLP

(57) ABSTRACT

A stair chair is provided and includes a seat 30, a backrest 34, a foot rest 32, upper handles 84 and lower handles 82. Three wheels 62 are mounted at each side of the chair. The wheels are pivotal about their own axis and also a common axis. Rotation about the common axis can be braked or locked. The chair can be lowered downstairs with a person pulling on the upper handle 84 and another person pushing on the lower handles 82 in order to slow movement of the chair down the stairs.

11 Claims, 7 Drawing Sheets

U.S. PATENT DOCUMENTS

| | | | |
|---|---|---|---|
| 4,154,315 A | | 5/1979 | Rasmussen |
| 4,264,082 A | | 4/1981 | Fouchey, Jr. |
| 4,280,716 A | * | 7/1981 | Vonsbaek et al. ............ 280/642 |
| 4,312,417 A | | 1/1982 | Dalton et al. |
| 4,401,178 A | | 8/1983 | Studer |
| 4,408,801 A | | 10/1983 | Edel et al. |
| 4,420,166 A | | 12/1983 | Law et al. |
| 4,432,426 A | | 2/1984 | Misawa |
| 4,473,234 A | | 9/1984 | Egen |
| 4,512,588 A | | 4/1985 | Cox |
| 4,531,752 A | | 7/1985 | Diener |
| 4,566,551 A | | 1/1986 | Feliz |
| 4,566,706 A | | 1/1986 | Bihler et al. |
| 4,569,409 A | | 2/1986 | Kluth |
| 4,639,012 A | * | 1/1987 | Jensen ........................ 280/642 |
| 4,643,446 A | | 2/1987 | Murphy et al. |
| 4,645,222 A | * | 2/1987 | Hester ....................... 280/5.26 |
| 4,650,197 A | | 3/1987 | Norris |
| 4,678,202 A | * | 7/1987 | Jensen et al. ............... 280/642 |
| 4,790,548 A | | 12/1988 | Descelles et al. |
| 4,826,196 A | | 5/1989 | Kirkpatrick et al. |
| 4,993,912 A | | 2/1991 | King et al. |
| 5,042,827 A | | 8/1991 | Mortenson |
| 5,060,967 A | | 10/1991 | Hulterstrum |
| 5,112,069 A | | 5/1992 | Aldus et al. |
| 5,158,309 A | | 10/1992 | Quigg |
| D336,710 S | | 6/1993 | Kinnaman |
| 5,253,885 A | | 10/1993 | McCracken et al. |
| 5,263,547 A | | 11/1993 | Alber |
| 5,338,048 A | | 8/1994 | Medina |
| 5,358,263 A | | 10/1994 | Aldus et al. |
| 5,366,274 A | | 11/1994 | Roericht et al. |
| 5,419,569 A | | 5/1995 | Walla |
| 5,480,172 A | * | 1/1996 | James ..................... 280/250.1 |
| 5,507,358 A | | 4/1996 | Abe et al. |
| 5,507,513 A | | 4/1996 | Peters et al. |
| 5,518,081 A | | 5/1996 | Thibodeau |
| 5,572,756 A | * | 11/1996 | Muuranen et al. ............. 5/626 |
| 5,577,567 A | | 11/1996 | Johnson et al. |
| 5,593,173 A | * | 1/1997 | Williamson ................ 280/642 |
| 5,701,965 A | | 12/1997 | Kamen et al. |
| 5,727,848 A | | 3/1998 | Gazard |
| 5,791,425 A | | 8/1998 | Kamen et al. |
| D409,120 S | * | 5/1999 | Aughpin ................... D12/128 |
| 5,975,225 A | | 11/1999 | Kamen et al. |
| 6,435,538 B2 | * | 8/2002 | Ellis et al. .................. 280/650 |

* cited by examiner

STAIR CHAIR

CROSS REFERENCE TO RELATED APPLICATIONS

This application is a division of U.S. patent application Ser. No. 09/362,651 filed Jul. 27, 1999, now U.S. Pat. No. 6,435,538 B2, issued Aug. 20, 2002.

BACKGROUND OF THE INVENTION

The present invention relates to chairs and to a method of moving chairs. The invention is particularly, although not exclusively, applicable to chairs that are for use in an emergency such as chairs for evacuating buildings and chairs for maneuvering patients.

SUMMARY OF THE INVENTION

According to one aspect of the present invention a stair chair is provided and includes at least one wheel assembly constrained to rotate about an assembly axis, the at least one wheel assembly comprising a plurality of wheels with each wheel being rotatable about its own wheel axis.

The chair may include means for selectively engaging and disengaging the wheel assembly arranged to resist rotation of the wheel assembly about the assembly axis. The means to resist rotation about the assembly axis may comprise means to prevent rotation about the assembly axis. Those means to prevent rotation about the assembly axis may comprise locking means.

The locking means may comprise a retractable plunger movable from a first position in which the plunger engages the wheel assembly and another part of the chair and a second position in which the plunger is disengaged from the wheel assembly. The plunger may be movable by a pivotal cam. The plunger may be biased towards the first position.

The locking means may be arranged to cooperate with an axle portion defining the assembly axis. The locking means may be arranged to cooperate with the axle portion in a central region of the axle. The locking means may be arranged to cooperate with the axle such that the axle can be locked in one or more positions, for example three positions. These positions may be equally angularly spaced from each other.

The means to resist rotation about the assembly axis may comprise a brake. The brake may be arranged to induce friction to resist rotation. The brake may be arranged to vary the friction force. The brake may comprise an arcuate member.

The arcuate member may be pivotally connected to the chair and movable about that pivot to apply or increase friction or to remove or decrease friction or any combination thereof. The pivot of the arcuate member may be arranged to be caused by an operating means. The operating means may comprise a threaded portion that is arranged to engage with a threaded member whereby relative rotation of the threaded portion and the threaded member is arranged to cause axial movement of the threaded portion to cause pivotal movement of the arcuate member.

Relative rotation of the threaded portion to the threaded member may be arranged to occur in opposed directions to cause axial movement of the threaded portion in one of two opposed directions.

The operating means may include moveable means for engaging and disengaging the threaded portion whereby reciprocal movement of the movable means is arranged to cause rotational movement of the threaded portion in one rotational direction only by engaging the threaded portion when moving the operating member in one direction of the reciprocal movement and disengaging this threaded portion in the opposite direction of reciprocal movement.

The assembly axis may be defined by an axle. The brake may be arranged to act on a downwardly facing portion of the axle. The brake may be arranged to engage with an enlarged portion of the axle.

The brake may comprise a pivotal operating member movable between a first position in which a brake portion does not have any significant braking effect and a second position in which the brake member is urged to resist rotation of the axle. Movement of the operating member may be arranged to move the brake between both positions.

The operating member may be arranged to be in an over center position when in at least one of the positions. For instance, when the brake is applied, the operating member may have to go through a pivotal position in which more force would be applied to the brake prior to returning to the first position. Alternatively, or additionally, resilient means may be arranged to bias the brake into an operative or inoperative position or both.

The operating member may be connected to a rotatable shaft at a location radially offset from the longitudinal axis of the shaft.

The brake may be adjustable whereby the length of the brake portion from the operating member to the axle is adjustable, for example by rotating a threaded portion of the brake portion.

The brake may be operable by the foot of an operator, for example both to apply the brake and to remove the brake. The chair may include an axle defining the wheel assembly axis. The brake and the locking means may be arranged to cooperate with the same axial extent of the axle. The brake and locking means may be arranged to act on opposite sides of the axle. The brake and the locking means may be arranged to cooperate with an enlarged portion of the axle.

The brake or alternatively or additionally the locking means may have the parts that cooperate with the axle concealed. The at least one wheel assembly may comprise three wheels.

The chair may include two wheel assemblies at opposed side regions of the chair. The two wheel assemblies may be constrained to rotate together about a common axis.

According to a further aspect of the present invention, a method of moving a stair chair which includes at least one wheel assembly that is constrained to rotate about an assembly axis in which the at least one wheel assembly comprises a plurality of wheels with each wheel being rotatable about its own wheel axis, the method comprising providing a support for the stair chair by at least one wheel from the wheel assembly and rolling the stair chair on at least one wheel.

The method may comprise providing support for the chair by at least two wheels of the wheel assembly.

The method may comprise preventing rotation of the assembly axis relative to the remainder of the chair whereby a single wheel of the wheel assembly is able to provide the support for the chair.

The method may comprise imposing a braking force on the assembly axis whereby resistance to rotation about the assembly axis is imposed. The method may comprise varying that resistance. The method may comprise imposing the resistance to rotation about the assembly axis when the chair is being moved down steps or down stairs.

The method may comprise the wheel assembly rotating about the assembly axis when the chair is being moved up or down steps or stairs such that successive wheels of the wheel assembly are caused to engage with the step or stairs. The method may comprise the chair pivoting about both a wheel axis and the assembly axis as the chair undergoes at least a part of its movement relative to steps or stairs. The method may comprise at least two wheels engaging the step or stairs as the chair undergoes movement relative to the step or stairs. The method may comprise at least two wheels of the or each wheel assembly rotating about their wheel axis as the chair undergoes movement along the step or stairs. The method may comprise one wheel rotating about its wheel axis and engaging an upwardly facing portion of a stair and another wheel engaging a generally horizontal portion of a step and rotating about its wheel axis or stair simultaneously as the chair is moved relative to the step or stairs.

According to another aspect of the present invention a foldable stair chair includes a backrest, a seat and a foot rest, the seat and foot rest being movable relative to the backrest from an operative position in which the backrest projects upwardly, the seat projects forwardly and the foot rest is located at a lower elevation than the seat, to a storage position in which the seat is located adjacent to the backrest and the foot rest is located adjacent to the seat.

In the storage position, the backrest, seat and foot rest may be generally parallel to each other. In the storage position at least two of the backrest, the seat and the foot rest may be in contact with each other and preferably all three of the backrest, seat and foot rest are in contact with each other.

In the operative position the foot rest may be arranged to extend downwardly and forwardly. In the operative position the backrest may be arranged to extend upwardly and rearwardly.

At least one of the seat and foot rest, and preferably both, are pivotally mounted on the chair and the seat and/or the foot rest may be pivotally movable between the operative and the inoperative position.

According to another aspect of the present invention a foldable stair chair includes a backrest, a seat and a foot rest, the foot rest being movable between an operative position in which the foot rest is located at a lower elevation than the seat and a storage position, the chair including releasable means arranged to retain the foot rest in the operative position.

The releasable means may comprise a retractable plunger arranged to engage with a part of the foot rest to resist movement of the foot rest away from an abutment.

According to another aspect of the present invention a foldable chair includes a backrest, a seat and a foot rest, the seat being pivotally mounted on the chair between an operative position in which the seat extends forwardly and a storage position in which the seat is pivoted upwardly, the seat, in the operative position, abutting with a portion of the foot rest to resist further downwards movement of the seat about its pivotal mounting.

The foot rest may be arranged to be pivotally mounted on the chair. The seat may be arranged to abut with the foot rest in the region of the pivotal mounting of the foot rest when the seat is in the operative position.

According to a further aspect of the present invention a chair includes a backrest, seat, foot rest and an upper handle portion, the handle portion being arranged, in use, to be located at a higher elevation than the backrest.

The height of elevation of the handle portion may be adjustable, for instance between a plurality of positions and the height of elevation of the handle portion may be arranged to be releasably held in a plurality of positions.

The configuration of the handle portion with respect to the remainder of the chair may be arranged to be adjustable and may be arranged to be held releasably in a plurality of different positions. One position of adjustment of the handle portion may be such that the handle portion extends to elevations substantially co-extensive with the elevation of other parts of the chair and another position in which the handle portion is at an higher elevation than other parts of the chair.

The handle portion may comprise a pair of handles and those handles may be arranged to extend towards each other and those handles may be arranged to have an extent in a substantially horizontal direction.

The handle portion may comprise a single member. The single member may be arranged to be pivotally movable on the chair.

The present invention also includes a method of operating a chair including a handle portion with the chair being substantially as herein described. The method may comprise using the handle portion to maneuver the chair up a step or stairs, or down a step or stairs, or along a generally horizontal plane, or any combination thereof.

According to a further aspect of the present invention a chair includes a backrest, a seat and a foot rest and a lower handle portion.

The lower handle portion may be arranged to project forwardly from the foot rest and may project forwardly and downwardly from the foot rest or downwardly from the foot rest or any combination thereof.

The handle portion may comprise a pair of handles spaced from each other.

The lower handle portion may include a pair of handles arranged to project forwardly from each side of the foot rest.

The handle portion may be arranged to occupy a plurality of positions and may be arranged to be releasably held in those positions.

The lower handle portion may comprise a pair of handles and the handles may be arranged to occupy a position in which they are substantially co-extensive, for instance side-by-side with, the foot rest.

The handle portion may be arranged to extend forwardly and upwardly from the foot rest.

The handle portion may comprise a single member and that single member may be arranged to be pivotable between a plurality of different positions.

The lower handle portion may be connected to the foot rest and may be constrained to move within the foot rest.

The present invention also includes a method of using a chair having a backrest, a seat, a foot rest and a lower handle portion as herein referred to. The method may comprise pushing against the lower handle portion to resist movement of the chair down a step or stairs or to urge the chair up a step or stairs or any combination thereof.

The present invention also includes a chair including a backrest, a seat and a foot rest in which the chair includes a support extending upwardly in the middle region of the chair.

Any or all of the foot rest, backrest, seat or wheel assemblies may be connected to the support in the central region. The upper handle portion may be adjustable relative to the support. The seat or the foot rest or both may be pivotally connected to the support. The brake or the locking means or both may be at least partially concealed within the support.

The at least one wheel assembly may be rotatably connected to the bottom region of the support.

According to a further aspect of the present invention, a chair incorporates a seat, a backrest and a handle portion, the seat and backrest being movable relative to each other between an operative position and a storage position in which, in the storage position, the handle portion is arranged to retain the seat and backrest together.

The handle portion may be movable, in the storage position, between a first position in which the seat and backrest can move relative to each other and a second position where that relative movement is inhibited. The movement of the handle portion may be pivotal. Locking means may be provided to retain the handle in the second position.

In the operative position the handle portion may be an upper handle portion.

The handle portion may comprise a pair of handles.

The seat may include a foot rest that is also movable between the operative position and the storage position. The foot rest may also be arranged to be retained in the storage position by the handle portion.

The present invention includes any combination of the herein referred to features or limitations.

BRIEF DESCRIPTION OF THE DRAWINGS

The present invention can be carried into practice in various ways but several embodiments will now be described by way of example, and with reference to the accompanying drawings in which.

DETAILED DESCRIPTION OF THE PREFERRED EMBODIMENTS

Figure 1:
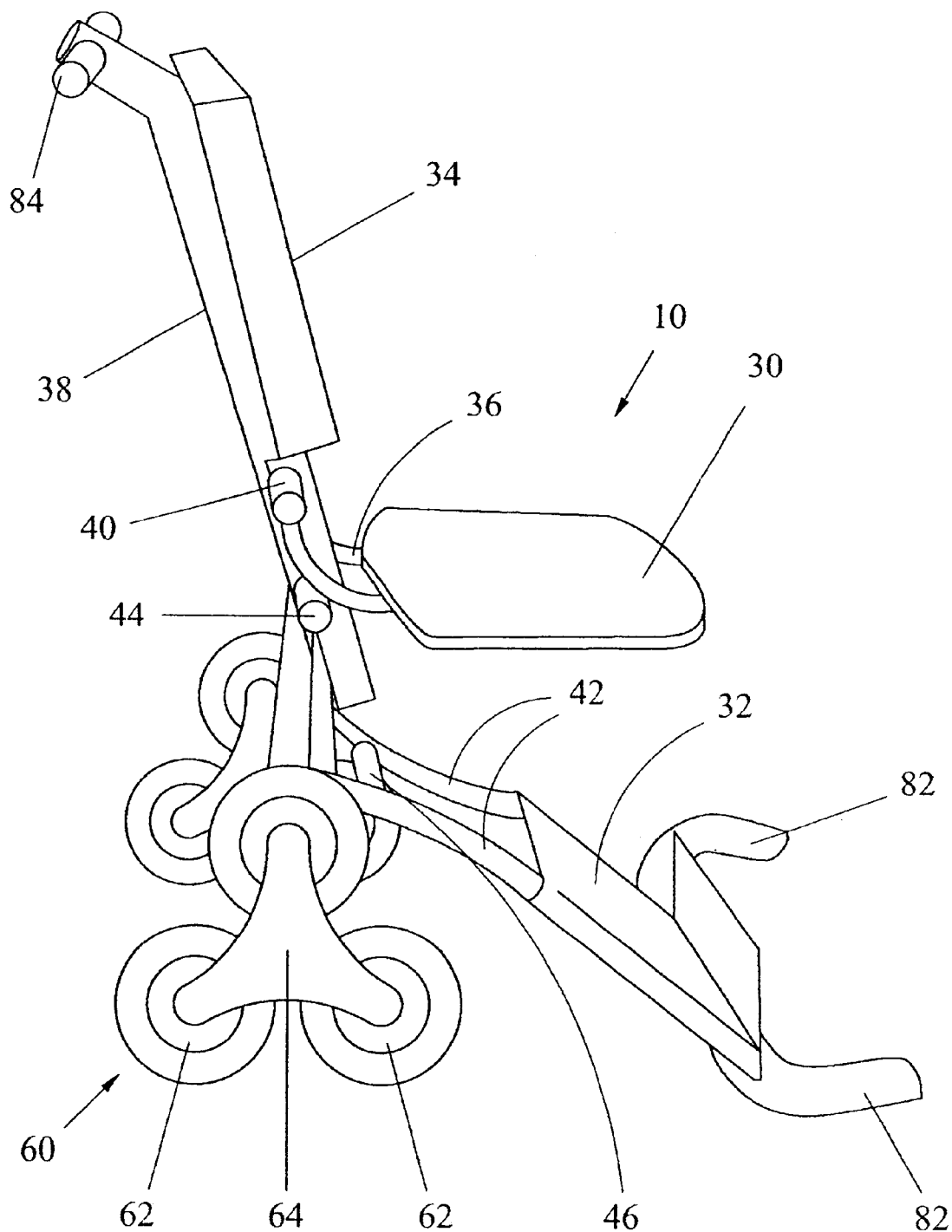
FIG. 1 is a side view of a chair in an operative position.

As shown in FIG. 1, the chair 10 includes a seat 30 on which, in use, a person to be transported sits with his feet resting on a downwardly and forwardly inclined foot plate 32 with his back being supported by an upwardly and rearwardly inclined backrest 34.

Figure 6:
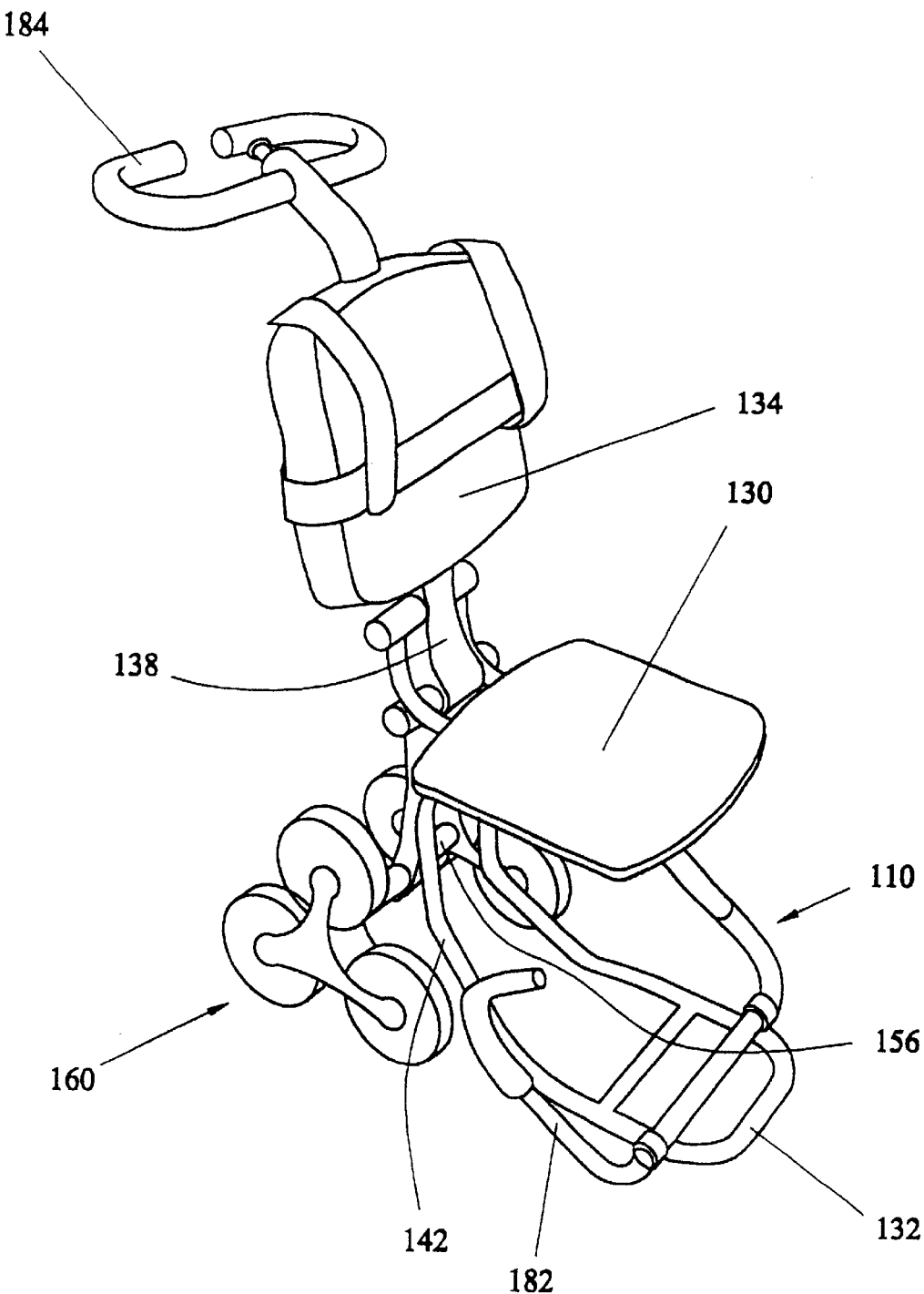
FIG. 6 is a perspective view of a second embodiment of a chair in an operative position.

As shown in another embodiment in FIG. 6, the foot rest 132 is defined by a series of three parallel bars which can rest on the ground and on which a patient's feet can rest. In this embodiment a patient's lower legs can extend straight down from his upper legs with the feet resting in a flat position.

Straps (not shown) may surround a patient's legs to hold them together on the foot plate 32 or foot rest 132. These straps may be fastened by cooperating hooks and eyes, for instance, to make the straps easily attachable and detachable. The straps may be connected to either side of the foot plate or they may be connected to the rear of the foot plate or they may extend over the complete under surface of the foot plate.

A harness (not shown) may be connected to the backrest 34 or 134 or to the rear of the backrest 34 or 134. Straps of the harness may go over each shoulder and under each arm to be detachably connected across the chest of a patient to be transported.

The straps of the foot rest and the harness hold the patient securely on the chair. This is of particular importance where the chair has to be moved in a hurry or where the chair has to negotiate steps where the operators controlling the chair will need their hands free to maneuver the chair.

Referring again to FIGS. 1 and 6, the seat 30 or 130 is supported by and connected to a pair of bars 36 that are pivotally connected to a central tubular trunk 38 or 138 of the chair. The bars 36 extend in a straight direction beneath the seat 30 or 130 before extending upwardly from the rear of the seat, to the axially aligned pivots 40 at each side of the trunk, as shown in FIG. 1. The foot rest 32 is supported by and connected to generally straight parallel bars 42 or 142 as shown that extend upwardly and rearwardly from the foot rest before extending generally upwardly to pivots 44 on each side of the trunk 38.

In the position shown in FIGS. 1 and 6, downwards movement of the seat 30 or 130 about the pivots 40 is prevented by abutment of the bars 36 of the seat with the mounting 44 for the pivots 40 of the bars 42 or 142.

Figure 3:
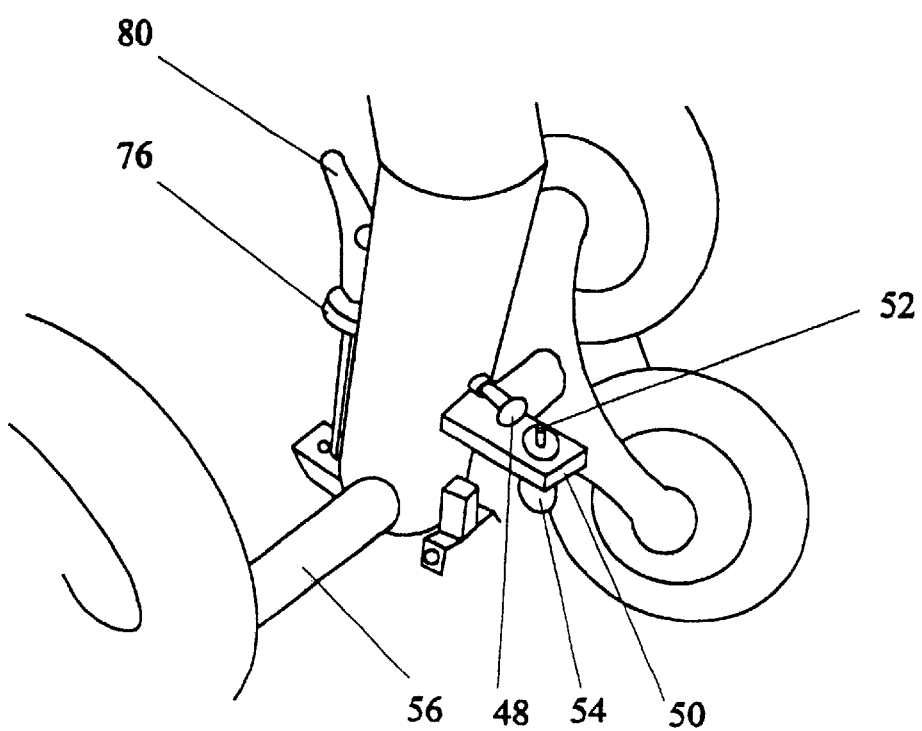
FIG. 3 is a detailed view of the rear of the base of the chair showing the mechanism that retains a foot rest of the chair in an operative position.

In the operative position shown in FIG. 1, downwards movement of the foot rest is prevented by abutment of a cross bar 46 extending between the bars 42 with a screw stop 48 extending forwardly from the trunk, as best shown in FIG. 3. The extent of the screw stop 48 from the trunk can be adjusted by rotating the screw portion to cause the stop portion to move in a translational direction towards or away from the trunk. A plate 50 extends forwardly from the trunk just below the screw stop 48. A plunger 52 projects upwardly through the plate. When cross bar 46 abuts the screw stop 48, forward movement of the cross bar is prevented by abutment with plunger 52. In this way the footplate is locked in position relative to the trunk. The plunger can be retracted down through plate 50, against a spring bias, by pulling downwardly on knob 54 located beneath the plate and connected to the plunger. In the retracted position of the plunger, the footplate can be moved about its pivot to allow the cross bar to move towards or away from screw stop 48.

Figure 8:
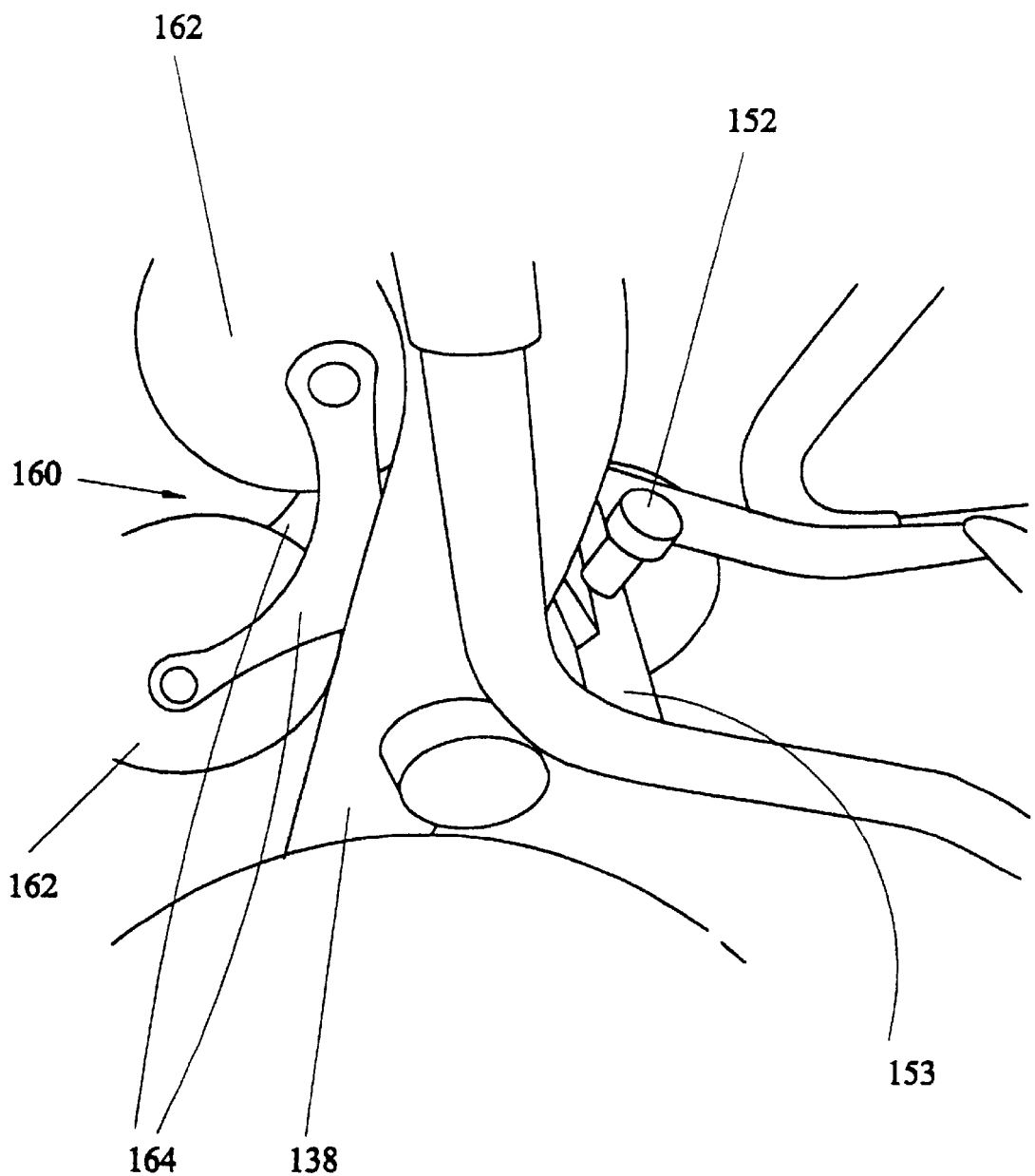
FIG. 8 is a detail view of a locking mechanism for a foot rest for the chair of FIG. 6.

In FIG. 8 a plunger 152 is mounted on a cross bar 153 of the foot rest. A bracket (not shown) is secured to the trunk 138 and, in the operative position, is located beneath the plunger 152. The plunger can be pulled to be retracted against a spring force. When released, the plunger extends through the cross bar 153 into an opening in the bracket to prevent movement of the foot rest relative to the trunk. The foot rest can be freed to allow it to be collapsed by retracting the plunger from the opening in the bracket.

Figure 2:
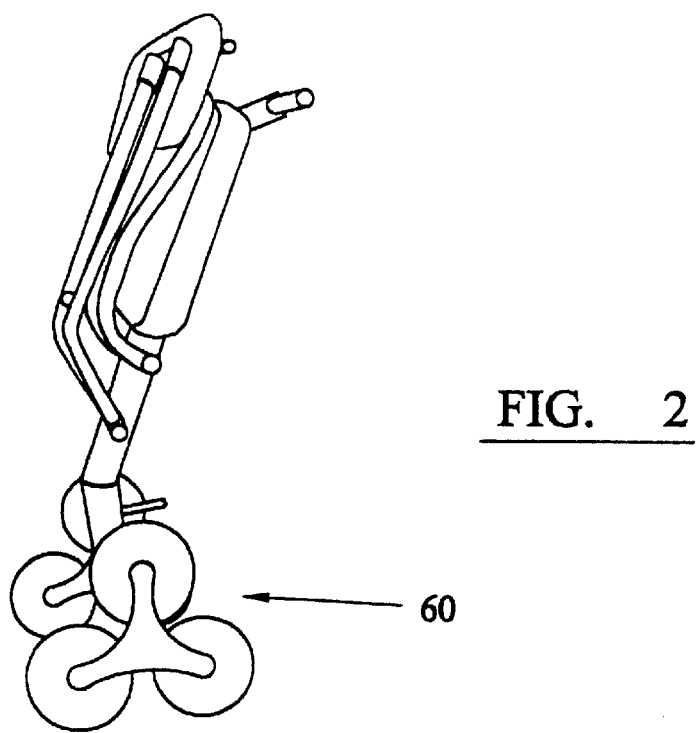
FIG. 2 is a side view of the chair in a storage position.

The stair chair can be moved from an operative position shown in FIGS. 1 and 6 to a storage position shown in FIG. 2 by moving the seat 30 or 130 upwardly about the pivots 40 until the seat 30 or 130 extends upwardly and rearwardly, flat against the backrest 34 or 134. Then the plunger 52 or 152 is retracted to release or free the cross bar and allow the foot rest 32 or 132 to be moved upwardly about the pivots 44 until the foot rest lies flat against what is normally the underside of the seat. In this position the planes of the backrest, seat and foot rest are generally parallel to each other and they are closely adjacent to each other or in contact with each other to provide a compact storage configuration. If desired, straps can be provided to secure the backrest, seat and foot rest together in the storage configuration. Alternatively, the handles 184 shown in FIG. 6 can be pivoted through 180° to bring the handles over the foot rest and seat to retain them in the storage position. In that configuration, one of the bars of the foot rest 132 projects above the handle to maneuver the chair on the wheels to lift the chair to a storage position.

The trunk 38 or 138 includes a lower tubular hollow branch 56 or 156, shown in FIGS. 3 and 6, through which an axle 58 (shown in FIG. 4) is rotatably mounted. The axle rotatably supports wheel assemblies 60 or 160 at each side of the chair.

Each wheel assembly 60 or 160 preferably includes three wheels 62 or 162 that are axially aligned with each other. The pivot axis of each wheel 62 or 162 is spaced an equal radial distance from, and an angular extent around the longitudinal axis of the axle 58. The mounting of each wheel 62 or 162 is provided by a pair of brackets 64 or 164 that are fixed to the axle 58 and that provide a pivot for each wheel 62 or 162 extending across the brackets 64 or 164 through each wheel.

In the storage position of the chair shown in FIG. 2, two of the wheels 62 or 162 at each side provide support for the chair. The trunk 38 or 138 though is able to pivot about the axle 58. That would make the chair unstable if the only support for the chair were provided by the wheels 62 or 162 and the chair would fall from the position shown.

Figure 4:
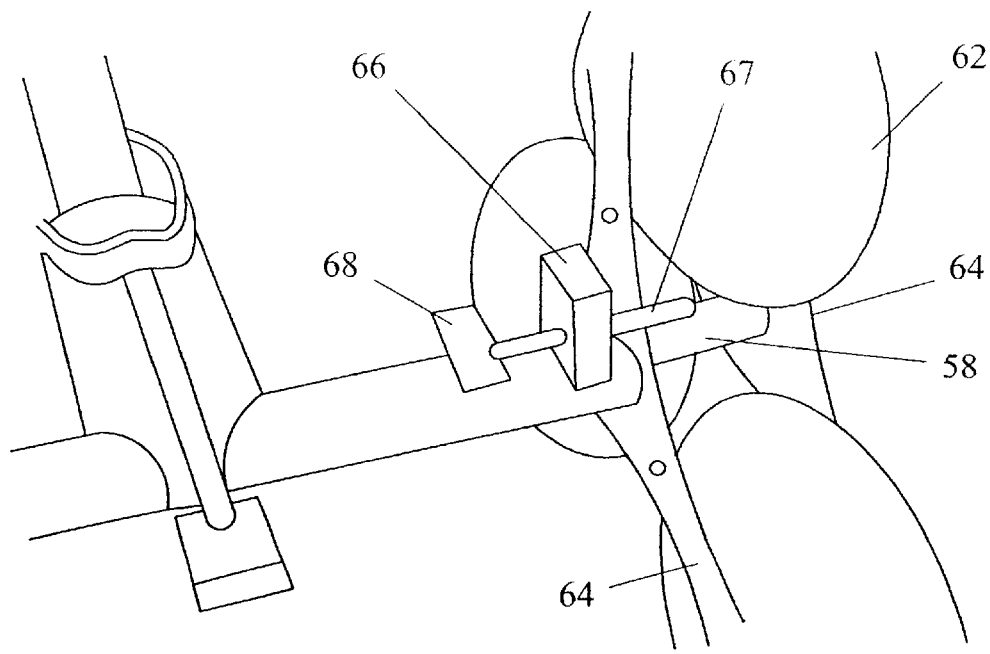
FIG. 4 is a view similar to FIG. 3 that shows a locking mechanism for a wheel assembly of the chair.

Accordingly axle and trunk locking means as shown in FIG. 4 are provided to prevent relative rotation of those parts. The locking mechanism for the chair 110 shown in FIG. 6 will be described later.

The locking means comprises a plate 66 extending upwardly from one side of the branch adjacent to the inside bracket 64 of a wheel assembly 60. A retractable plunger 67 extends through the plate into a hole (not shown) in the bracket 64. With the plunger being located in the hole in the bracket, the bracket is not able to rotate relative to the branch or trunk and the axle 58 is fast with the trunk.

The plunger can be retracted against a spring force, by pivoting a lever 68 from the horizontal position shown in FIG. 4 to an upright position. During that movement of the lever 68, a cam is engaged to cause axial movement of the lever and the plunger to which it is connected to retract the plunger from the hole. Insertion of the plunger into the hole is achieved by moving the trunk about the axle 58, if necessary, to align the plunger with the hole in the bracket and pivoting the lever 68 back into the horizontal position to allow the spring to push the plunger into the locking position.

Chair 10 is also provided with a brake to inhibit free rotation of the trunk 38 about the axle 58. The brake for the chair 110 will be described later.

Figure 5:
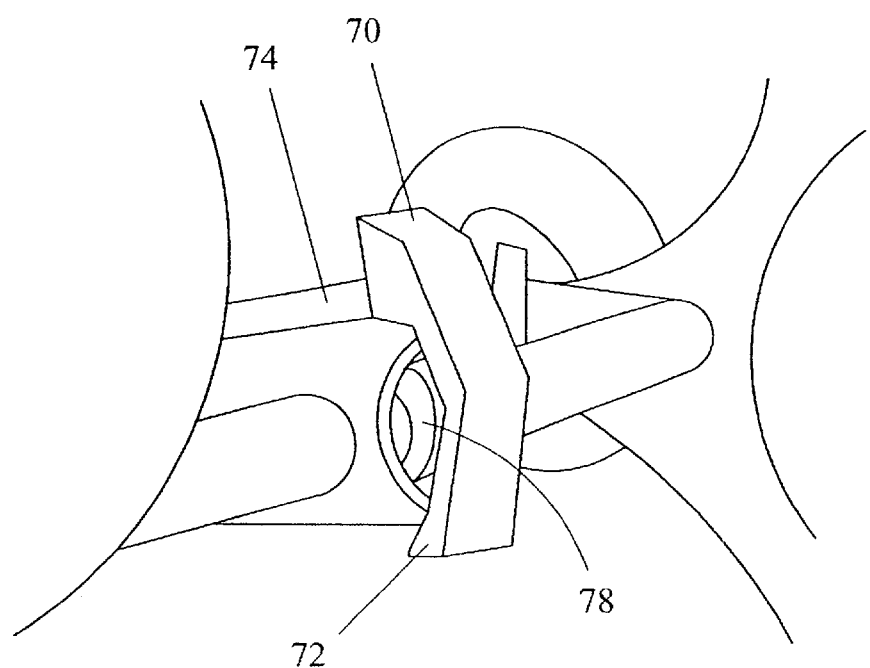
FIG. 5 is an underneath view of part of the chair showing a brake mechanism.

The brake is located at the base of the trunk, as shown in FIG. 5. The brake comprises an operative member 70 connected by a pivot 72 at one side of the trunk and extending around the base of the trunk where it is connected to rod 74 that extends up the other side of the trunk through a bracket 76 extending from the rear of the trunk. The rod 74 can be moved up and down along the trunk as described below to cause member 70 to move about pivot 72.

The upwardly facing surface of member 70 includes an arcuate friction member (not shown) that is arranged to cooperate with a friction disc 78 secured to axle 58 and projecting through the lower end of the trunk.

As rod 74 is moved upwardly, the operative member 70 is moved about pivot 72 to cause the friction member to engage with the friction disc to inhibit relative rotation of axle 58 and trunk 38.

Further upwards movement of the rod causes that resistance to relative movement to be increased. Ultimately the brake can lock the axle 58 and trunk together.

Movement of rod 74 is achieved by a control lever 80 above bracket 76 and through which the rod extends. Rod 74 threadably engages bracket 76 such that relative rotation of the rod causes up or down movement of the rod along the trunk.

Lever 80 is pivotally connected to the bracket such that a socket (not shown) in the base of the lever can selectively engage with a nut on the top of the rod. Adjustment of the rod is achieved by pivoting the rod in an upwards direction to engage the socket with the nut and then rotating the lever in one direction to cause the rod to rotate. Then the lever is pivoted in a downwards direction to disengage the socket from the nut and the lever is rotated in the opposed direction without rotating the rod. By repeating this sequence, the rod can be repeatedly rotated in one direction to raise or lower the rod and to increase or decrease or remove the brake, depending on the direction of rotation when the nut and socket are engaged.

Figure 7:
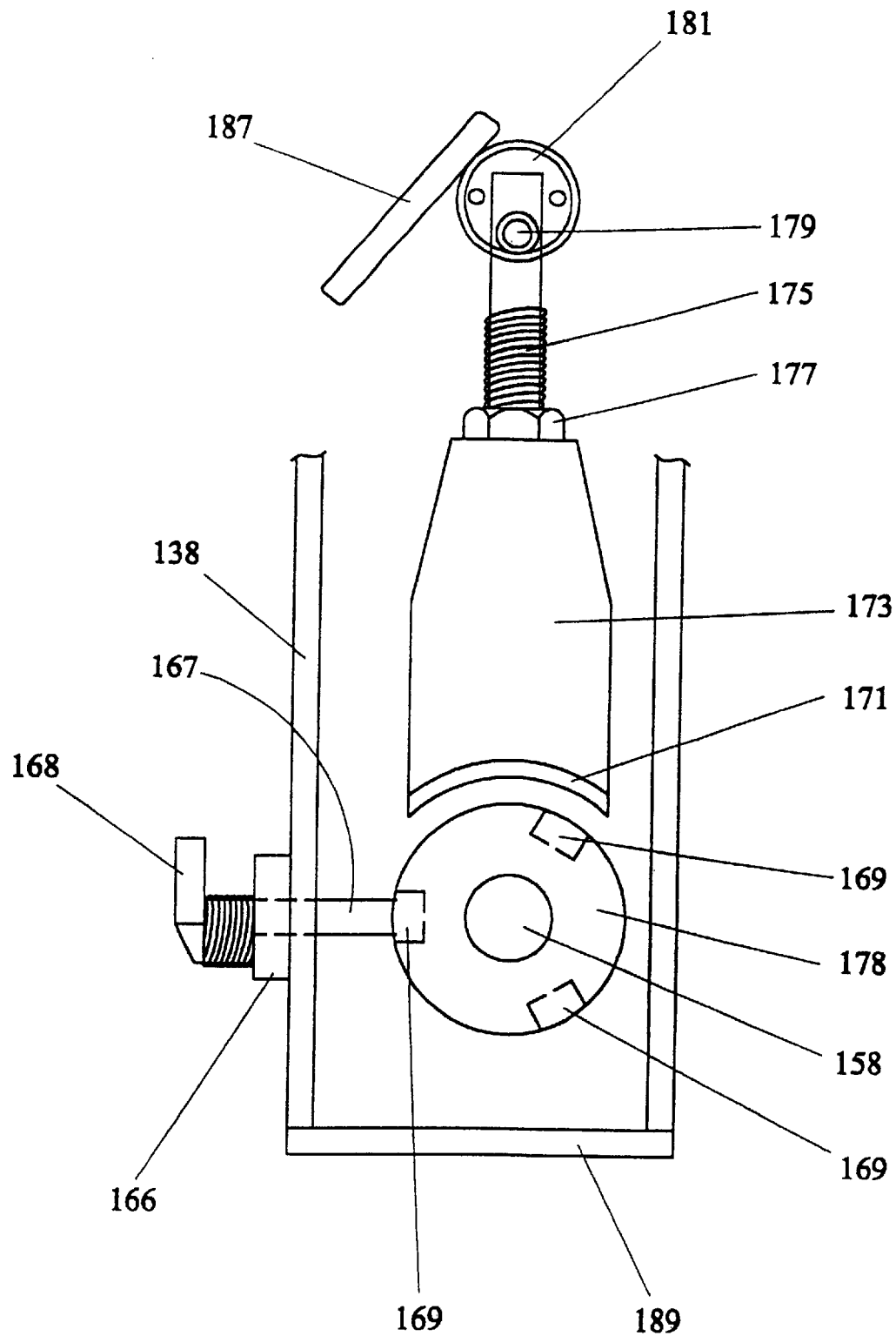
FIG. 7 is a schematic side view of a brake and locking mechanism employed for the chair of FIG. 6.

The locking mechanism of the chair 110 will now be described with reference to FIG. 7. A plate 166 is secured to the trunk 138 adjacent to the bottom of the trunk. A retractable plunger 167 extends through the plate 166 and the trunk 138 towards a friction disc 178 that is secured to axle 158. The plunger is able to be biased towards the disc to rest in one of a series of three holes 169 that are equally spaced in the circumferential surface of the disc 178. When located in one of the holes the axle 158 is secured to the trunk and the wheel assemblies are always in the same configuration with respect to the trunk, even though each wheel may be in one of three possible positions.

The plunger can be retracted against a spring force by pivoting a lever 168 to cause a cam to be engaged to cause axial movement of the plunger.

The plunger is applied by a spring force against the disc by moving the lever in the opposite direction. The chair can then be moved to rotate the axle until the plunger is aligned with, and moves into another one of the holes 169.

The brake for the chair is also located in the bottom of the trunk. It includes a brake liner 171 on a block 173 that can act against the upwardly facing surface of the disc 178.

The top of the block 173 is attached to a threaded rod 175 that is locked in position by a nut 177. The nut 177 can be slackened and the rod can be screwed into or out of the block, before tightening the nut 177 again, to alter the extent of the rod 175 from the block to adjust the effective length of the assembly and the breaking force, for instance to take account of wear of the friction surfaces.

The top of the rod includes a cylindrical opening. A bolt 179 is passed through that opening and threadably engages with the end of a shaft 181 off center from the longitudinal axis of the shaft 181.

Figure 9:
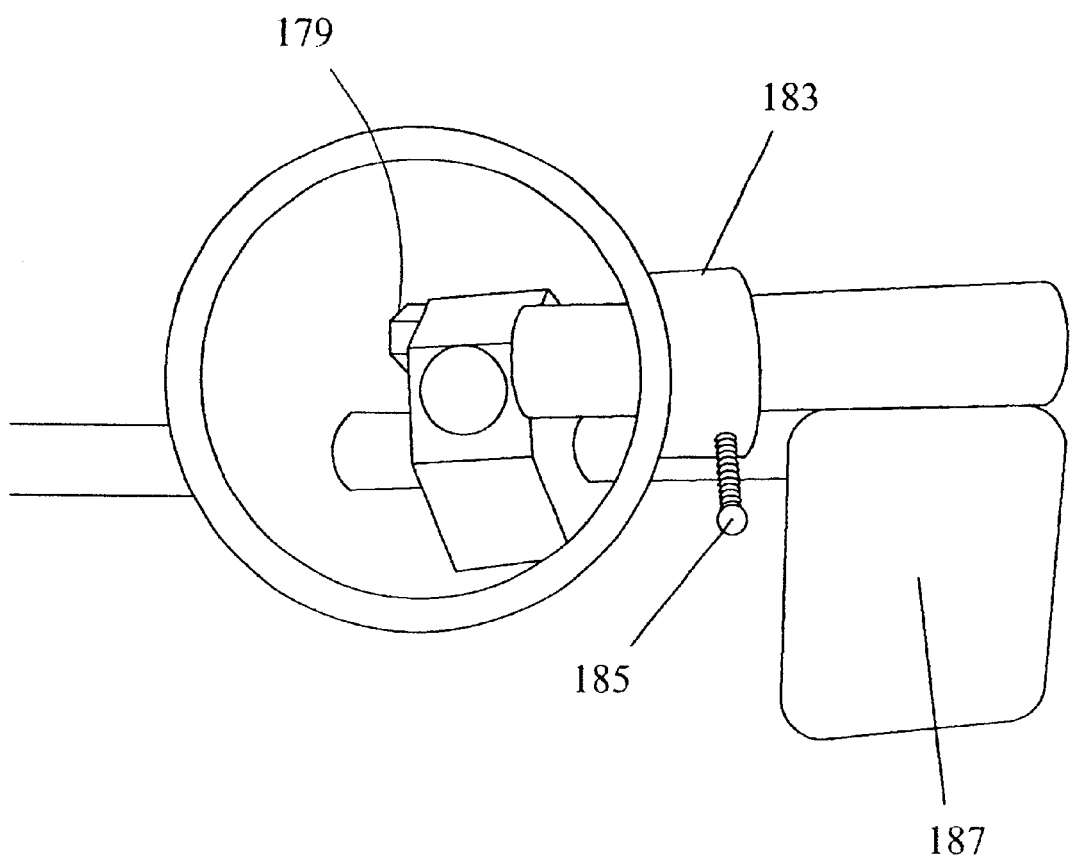
FIG. 9 is a view from underneath of part of the brake mechanism for the chair of FIG. 6.

The shaft 181 extends through the trunk 138 and is rotatably mounted in a bushing 183 (see FIG. 9) on the side of the trunk. A bolt 185 threadably engages with the bushing 183 and extends into a circumferential groove of the shaft 181 to axially locate the shaft.

A foot pedal 187 is secured to the free end of the shaft. Pushing the pedal down causes the bolt 179 to move from a position in which its center is generally at the same height as the axis of the shaft, around to a position in which the center of the bolt is generally beneath the axis of the shaft. This movement causes the top of the rod 175 to move in an arcuate direction downwardly and to the right to apply the brake. If desired, this position may be such that the axis of the rod 175 extends over center, to the right of the axis of the shaft 181 such that the rod resists movement in the reverse direction as such movement would tend first to urge the brake more firmly into engagement before the brake was released.

The brake is removed by a user pushing up with his foot on the underside of the pedal 187 to cause the bolt 179 to move back, taking with it the rod 175.

If desired, the pedal can be raised until the axis of the rod 175 again passes to the right of the axis of the shaft 181 in an over center position to prevent the brake from coming on again.

Alternatively or additionally, a spring (such as a compression spring) may be connected between the pedal or an extension of the pedal such that, with the pedal pushed down to apply the brake, the spring urges the brake on, and, with the pedal in the raised position, the spring acts to hold the pedal up and the brake off.

The bottom of the trunk may include a cap 189 to protect the brake and locking mechanism from the environment.

The chair 10 or 110 has many modes of operation including:

movement up stairs or steps;

movement down stairs or steps, and movement along a non-stepped surface.

Referring first to movement upstairs or steps, the axle is able to rotate relative to the trunk. The chair is reversed towards the steps by a first operator tilting the trunk rearwardly by pushing down and rearwardly on upper handles 84 at the top of the chair to raise the foot rest and associated lower handles 82 or 182 clear of the ground. Then that operator pulls the handles 84 or 184 rearwardly to cause the chair to roll rearwardly over the ground on two pairs of wheels 62 or 162 at each side of the chair.

When one wheel 62 or 162 at each side of the chair abuts the vertical surface of a step a second operator grips the lower handles. Then the first operator pulls on the upper handles 84 or 184, generally in the line of inclination of the steps, and the lower operator may, optionally, apply a lifting force or a pushing force or both.

The first wheels 62 or 162 that engage with the base of the step remain in position and the wheel assemblies 60 or 160 pivot about the axis of the axle 58 to cause the wheels 62 or 162 of the assemblies that previously provided no support for the chair to move towards engagement with the step and to raise the remaining wheels clear off the ground.

The wheel assemblies continue to rotate to bring successive wheels into contact with the steps as the chair is being moved up the stairs. Thus the wheels provide vertical support for the chair over the majority of the movement of the chair. Furthermore, as the wheels engage with the vertical part of the steps control is provided on the movement of the chair up the steps.

For steps having large horizontal surface, two wheels will briefly be in contact with the step as the chair is advanced along that step until the leading wheels abut the base of the next vertical step. As the chair is being lifted following that abutment, succeeding wheels may abut the vertical extent of the steps as the chair is being raised, together with the wheel that abutted the base of the step to roll the chair up. Alternatively, the wheel succeeding that at the base may engage the flat surface of the next step or the corner between the horizontal and vertical parts of the step to cause both wheels to ride around the corner.

To descend stairs, the brake can be applied to an extent, if desired, to stop the chair from tending to run away down the stairs and to ease the load on the operators to resist that movement. The chair is pushed along the ground towards the stairs in a forwards direction by an operator gripping the handles 84 or 184 and with the chair being tilted back slightly such that two pairs of wheels at each side support the chair.

As the top of the stairs are approached, an operator already part of the way down the stairs grips the lower handles 82 or 182. The operators then provide resistance, if required, to the force of gravity moving the chair down the stairs with the wheel assemblies and the axle 58 moving and engaging with the steps substantially as previously described. The lower handles, in the position shown, extend downwardly and forwardly from the foot rest, generally in the direction of the foot rest. Consequently the lower operator is clear of the foot rest and the feet of a person on the chair. Furthermore, the lower operator can take the handles and control movement of the chair without necessarily having to bend at all, and may only have to push against the handles.

To move the chair along flat ground, only one operator need be used who grips the upper handles 84 or 184. To make the chair more maneuverable, the wheel assemblies and the axle can, optionally, be locked in position relative to the trunk either by the brake, or more preferably, by locking the brackets of the wheel assemblies. Then the chair can be tipped back such that support is provided by one wheel only at each side. This allows the chair to be maneuvered, forwards or backwards, and around corners without resistance such as would be provided if two supporting wheels at each side had to scrape around the corner.

The lower handles are able to occupy more than one position relative to the foot rest. In the figures, the handles are shown as projecting forwardly from the foot rest in the general plane of the foot rest. These handles though could be pivoted to a position in which they extend alongside the foot rest in the plane of the foot rest. This provides a compact configuration when the chair is being maneuvered on a flat surface or is useful when the chair is being stored. The lower handles are able to occupy a third position in which they extend upwardly, generally at right angles to the plane of the foot rest. This position is particularly useful when the chair is being lowered down stairs as it enables the lower operator to push or lean against the handles to provide resistance to the chair moving downstairs.

The upper handles are also able to occupy more than one position. Although the upper handles are shown in FIGS. 1 to 5 as being a straight cross-bar, in practice each end of the bar may include parallel bars that extend first away from the axial extent of the cross-bar and then back, to a small extent, towards each other to allow that small extent, known as a hand grip, to be held.

The upper handles are able to rotate on their mounting relative to the trunk. The handles can occupy a first position in which the bars that extend from the cross-bar to the hand grip are generally parallel to the longitudinal extent of the trunk. This allows the hand grips to be engaged to allow an upper operator to pull the chair upstairs or to lower the chair downstairs. To ensure that the upper operator can maintain an advantageous lifting or weight bearing position, the cross bar is mounted on a rod that is telescopically located within the trunk. A retractable spigot (not shown) extends through the trunk and can be selectively engaged in one of a series of, for instance, eight openings in the rod to locate the rod in the required telescopic position relative to the trunk.

With the rod being extended from the trunk, the chair is adapted for easy lowering down particularly steep stairs with a favorable operator position.

With the rod being collapsed within the trunk the configuration is compact for storage. In that position the bars that extend away from the cross bar may extend downwardly or parallel to the spine to occupy a compact storage configuration.

The bars that extend from the cross bar may also extend rearwardly of the trunk, or rearwardly and downwardly relative to the trunk. This is a particularly favorable position for an operator to be able to engage the hand grips and tilt the chair back slightly for maneuvering on flat ground or to allow the chair to approach stairs.

The upper and lower handles are each mounted on a cross-bar that extends through a socket. A retractable spigot may extend through the socket to allow one of a selected series of holes in the cross-bars to be engaged to hold the cross-bar and thus the handles in the required angular position.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

We claim:

1. A chair including at least one wheel assembly having an assembly axis, said wheel assembly being constrained to rotate about the assembly axis, the at least one wheel assembly comprising a plurality of wheels, each of said wheels being rotatable about its own axis, said chair further including a backrest, a seat and a foot rest, said foot rest being pivotally mounted on said chair, said seat being pivotally mounted on said chair between an operative position in which said seat extends forwardly and a folded, storage position in which said seat is pivoted upwardly, said seat, in the operative position, abutting with a portion of said foot rest in the region of the pivotal mounting of said foot rest to resist further downward movement of said seat about its pivotal mounting.

2. A chair as claimed in claim 1 including a handle portion which is adjustable between a plurality of different positions, one position of adjustment of said handle portion being such that the handle portion extends to an elevation substantially co-extensive wit the elevation of the other parts of said chair and another position in which the handle portion is at a higher elevation than the other parts of said chair.

3. A chair including a back rest, a seat, and at least one wheel assembly having an axle defining an assembly axis, said at least one wheel assembly being constrained to rotate about said assembly axis, the at least one wheel assembly comprising a plurality of wheels, each of said wheels being rotatable about its own axis, said chair further including a foot rest pivotally mounted on said chair, said seat and said foot rest being movable relative to the back rest from an operative position in which said back rest projects upwardly, said seat projects forwardly abutting said foot rest in the region of pivotal mounting of said foot rest, and said foot rest is located at a lower elevation than said seat to a folded, storage position in which said seat is located adjacent to said back rest and said foot rest is located adjacent to said seat, and in which, in said storage position, said back rest, said seat, and said foot rest are generally parallel to each other.

4. A chair as claimed in claim 3 in which said seat is and is pivotally movable between said operative and storage positions.

5. A chair including a back rest, a seat, a foot rest, and at least one wheel assembly having an axle defining an assembly axis, said at least one wheel assembly being constrained to rotate about said assembly axis, the at least one wheel assembly comprising a plurality of wheels, each of said wheels being rotatable about its own axis, said foot rest being pivotally mounted on said chair, said seat being pivotally mounted on said chair between an operative position in which said seat extends forwardly and a folded, storage position in which said seat is pivoted upwardly, said seat, in the operative position, abutting with a portion of said foot rest in the region of the pivotal mounting of said foot rest to resist further downward movement of said seat about its pivotal mounting.

6. A chair as claimed in claim 5 including a handle portion which is adjustable between a plurality of different positions, one position of adjustment being such that said handle portion extends to an elevation substantially co-extensive with the elevation of the other parts of said chair and another position in which said handle portion is at a higher elevation than the other parts of said chair.

7. A chair including a central trunk, a back rest, a seat, a foot rest, a lower handle portion, and at least one wheel assembly having an axle defining an assembly axis, said at least one wheel assembly being constrained to rotate about said assembly axis, the at least one wheel assembly comprising a plurality of wheels, each of said wheels being rotatable about its own axis, and said seat being pivotally mounted on said central trunk to an operative position in which downward movement of said seat is prevented by at least one mounting extending from said central trunk.

8. A chair as claimed in claim 7 in which said lower handle portion is arranged to project forwardly from said footrest.

9. A chair as claimed in claim 7 in which said lower handle portion is arranged to project forwardly and downwardly from said footrest.

10. A chair as claimed in claim 7 in which said lower handle portion comprises a pair of handles spaced from each other.

11. A chair as claimed in claim 7 in which said lower handle portion is connected to said foot rest.

* * * * *